United States Patent Office 3,449,445
Patented June 10, 1969

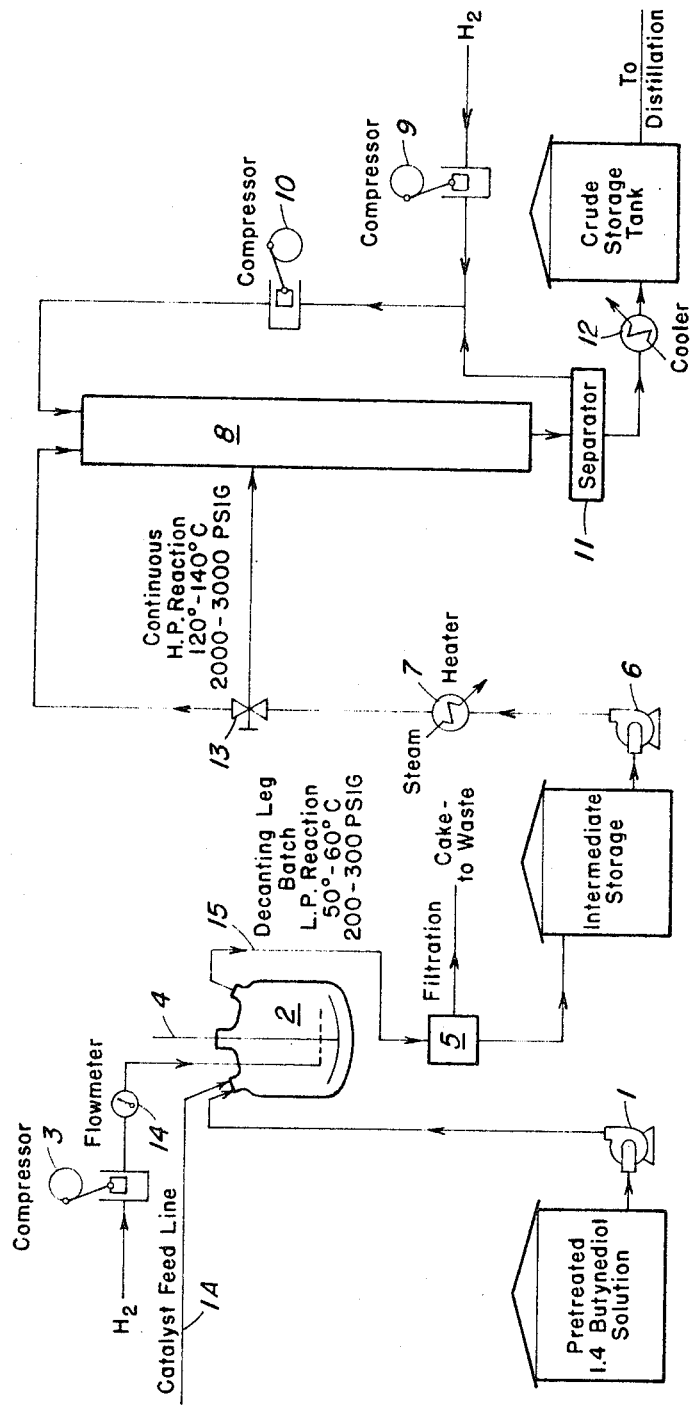

3,449,445
PROCESS OF PREPARING 1,4-BUTANEDIOL
Frank E. Wetherill, New York, N.Y., assignor to GAF Corporation, New York, N.Y., a corporation of Delaware
Filed Mar. 17, 1967, Ser. No. 623,957
Int. Cl. C07c 31/18
U.S. Cl. 260—635                              1 Claim

ABSTRACT OF THE DISCLOSURE 1,4-butynediol is reduced to 1,4-butanediol in increased yield and of improved quality by first partially hydrogenating 1,4-butynediol with hydrogen in the presence of Raney-type nickel catalyst at 50°–60° C. and a hydrogen pressure of 200–300 p.s.i.g. until absorption of hydrogen ceases, separating the catalyst from the partially hydrogenated product and continuing the hydrogenation of said product in a separate, continuous high-pressure reactor at a temperature of 120°–140° C. and a hydrogen pressure of 2000–3000 p.s.i.g. in the presence of a silica gel catalyst containing from 14–16 parts by weight of nickel, 4 to 6 percent by weight of copper and from 0.5 to 1 percent by weight of manganese.

---

This invention relates to an improved process of catalytically hydrogenating 1,4-butynediol to 1,4-butanediol of increased yield and of improved quality.

The hydrogenation of 1,4-butynediol to 1,4-butanediol in the presence of a number of different catalysts and by different procedures is well known in the art. A commercial high-pressure continuous process, which was designed to achieve 10 million pounds per year capacity, involved the dilution of pre-treated 1,4-butynediol with a crude reaction product (partially hydrogenated 1,4-butynediol) as recycle in the proportions of 1:2, preheated to a temperature of 40°–80° C. and flowed by means of a pump into the top of a vertical, tubular reaction vessel with a fixed bed of a catalyst comprising nickel, copper, manganese, on a granular silica carrier. Concurrently, hydrogen gas was introduced into the top of the reactor and the 1,4-butynediol in the solution converted to 1,4-butanediol by reacting with the concurrent stream of hydrogen as it trickled down over the catalyst in the reactor at a temperature of 40°–140° C. and a hydrogen pressure of 2,000–3,000 p.s.i.g. The mixed gas and liquid effluent from the reactor were separated, the gas recycled to the reactor along with the make-up hydrogen, and the liquid product partly recycled as dilution for fresh feed and partly fed forward to the distillation system to recover the finished 1,4-butanediol. In this high pressure system, the operating conditions varied with the age of the catalyst in use.

With a fresh catalyst, it wasn't absolutely necessary to preheat the feed, but the heat of the reaction would raise the temperature to the range of 120–140° C. at the bottom of the reactor. With an older catalyst, it may be necessary to preheat the feed to a temperature range of 60°–80° C. in order to obtain the final temperature of 120°–140° C. The pressure in the reactor was maintained in the range of 2,000 to 3,000 p.s.i.g. with the make-up hydrogen through a compressor.

The foregoing high pressure continuous process, as commercially carried out, had a production capacity of approximately 7 million pounds per year with a theoretical yield of 85% of 1,4-butanediol and of the following averages of analysis:

Freezing point _____ ° C__ 18.64
1,4-butanediol _____percent__ 97.58
Carbonyl No. _____ 1.10
APHA color _____ 20
Water _____percent__ 0.33

Although this continuous process had the capacity to finish off the reaction satisfactorily, the system, however, could not handle the heat removal requirements. Moreover, while this continuous process could produce 1,4-butanediol of the foregoing characteristics during the beginning of a catalyst run, it could not do so towards the end of the run.

Because of the difficulty in attaining the design performance of the foregoing high pressure continuous process, an alternate low pressure batch process design was developed for a completely separate unit to carry out the process of preparing 1,4-butanediol. This process involved batch hydrogenation of the pretreated 1,4-butynediol solution over a Raney nickel type catalyst at pressures in the range of 200 to 300 p.s.i.g. After the hydrogenation of each batch, the catalyst was allowed to settle in the hydrogenator and the product decanted through a filter to storage prior to distilling to recover the finished 1,4-butanediol. Each batch was processed under two different conditions: A first step in which the bulk of the reaction was carried out at a temperature of 50 to 60° C. and a final step in which the temperature was raised to the range of 120° to 140° C. to complete the hydrogenation and "soak" out the impurities. In this process, a charge of catalyst could be reused for anywhere from 20 to 40 batches before it had to be discarded.

The alternate batch process, while capable of handling the high heat removal requirements, could not carry the hydrogenation far enough to produce a high grade product and had a production capacity of about 9 million pounds per year, with a yield of approximately 88% of theoretical, with about the same average analysis as above.

I have found that by the combination of the foregoing low and high pressure processes into two consecutive steps of a single process, 1,4-butanediol is produced at a capacity of about 17 million pounds per year with a theoretical yield of 90 to 91% of improved quality having the following average analysis:

Freezing point _____ ° C__ 19.26
1,4-butanediol _____percent__ 98.30
Carbonyl No. _____ 0.29
APHA color _____ <5
Water _____percent__ 0.20

The process of the present invention is best described by reference to the flow sheet of the accompanying drawing. It consists of batch-wise hydrogenation by feeding, by means of pump 1, a pretreated aqueous solution of 1,4-butynediol of 35%–40% concentration, from which formaldehyde has been removed by the procedure described in U.S. Patent 2,993,708, at a pH of 6.5 to about 7.5, to low pressure reactor 2 containing a Raney-type nickel catalyst (as described in U.S. Patent 1,638,190), which is readily prepared by treating an aluminum alloy with caustic soda to dissolve out the aluminum and leave the nickel in a highly divided form. The amount of catalyst employed, which is fed into reactor 2 by catalyst feed line 1a, is not critical since it is not deactivated during the hydrogenation and is reused for anywhere from 20 to 40 batches before it has to be discarded. In general, however, the amount of nickel catalyst employed may vary from about 1 to 4% by weight of the 1,4-butynediol solution charged. After the 1,4-butynediol solution is charged, the reactor 2 is maintained at a temperature of 50°–60° C. by internally heated or cooled coils not shown and a hydrogen pressure of 200–300 p.s.i.g., furnished by hydrogen source and compressor 3. The contact of the 1,4-butynediol and catalyst is facilitated by stirrer 4, and the hydrogenation is continued until the desired partial hydrogenation of the 1,4-butynediol is achieved as becomes apparent when absorption of hydrogen ceases as measured by flowmeter 14.

The reaction mixture is allowed to settle and the partially hydrogenated product is decanted away from the catalyst by means of decanting leg 15 through a filter 5 to intermediate storage for pumping into the high pressure portion of the process. Each charge of catalyst lasts for 20 to 40 batches before it must be replaced. From the intermediate storage, the partially hydrogenated solution is then pumped by means of pump 6 through steam heater 7 through the continuous high pressure reactor 8 at 2,000 to 3,000 p.s.i.g. and a temperature of 120°–140° C. with a stream of hydrogen from a source through compressors 9 and 10 to the inlet of continuous vertical tubular reactor 8 which had been previously filled with a fixed bed of catalyst consisting of 14–16% by weight of nickel and 4 to 6% by weight of copper and 0.5 to 1.0% by weight of manganese on a silica gel carrier.

The completely hydrogenated product is separated by conventional separator 11, the hydrogen gas being recycled with make-up hydrogen and returned by compressor 10 to the reactor 8. The separated liquid product is then cooled down to about room temperature by means of water cooler 12 and flowed to the crude storage tank for conventional distillation and recovery of finished 1,4-butanediol in average yields of 90.5%.

The first run under the foregoing operating conditions gave a catalyst life in the continuous high pressure reactor 8 of about 12 million pounds of 1,4-butanediol. The subsequent several runs, however, gave a short catalyst life, from a few hundred thousand to about 1 million pounds of 1,4-butanediol. It was found that the subsequent short catalyst life was due to the plugging of the catalyst bed at the top first third of reactor 8. To avoid this plugging, a by-pass valve 13 was installed between steam heater 7 and continuous reactor 8 to permit the feed of partially hydrogenated product to flow below the first third of the catalyst bed in reactor 8, at the same temperature, i.e. 120°–140° C. By this expedient, the subsequent catalyst life was maintained in the range of 3 million to 4 million pounds of 1,4-butanediol or a total of about 17 million pounds per year of 1,4-butanediol with a theoretical yield of 90 to 91%.

I claim:

1. A process for the catalytic hydrogenation of 1,4-butynediol to 1,4-butanediol which consists of treating an aqueous solution of 1,4-butynediol of 35–40% concentration at a pH of 6.5 to about 7.5 with hydrogen at a temperature of 50°–60° C. and a pressure of 200–300 p.s.i.g. in the present of Raney-type nickel catalyst, removing the said catalyst by filtration and treating the filtrate with hydrogen at a temperature of 120°–140° C. and a pressure of 2,000–3,000 p.s.i.g. in the presence of silica gel catalyst carrying thereon 14 to 16% by weight of nickel, 4 to 6% by weight of copper and 0.5 to 1.0% by weight of manganese and recovering the 1,4-butanediol by distillation.

References Cited

UNITED STATES PATENTS

| | | | |
|---|---|---|---|
| 2,950,326 | 8/1960 | Hort | 260—635 |
| 2,961,471 | 11/1960 | Hort | 260—635 |
| 2,967,893 | 1/1961 | Hort et al. | 260—635 |
| 3,184,513 | 5/1965 | Moore et al. | 260—635 |

LEON ZITVER, *Primary Examiner.*

J. E. EVANS, *Assistant Examiner.*